US007561652B2

(12) United States Patent
Hall et al.

(10) Patent No.: US 7,561,652 B2
(45) Date of Patent: Jul. 14, 2009

(54) HIGH FREQUENCY SPREAD SPECTRUM CLOCK GENERATION

(76) Inventors: Paul Kevin Hall, 872 Marblehead Dr., Lexington, KY (US) 40409; Keith Bryan Hardin, 2404 Shady Oak Pl., Lexington, KY (US) 40515; Robert Allan Menke, 134 Dickinson Dr., Georgetown, KY (US) 40324; Robert Aaron Oglesbee, 2067 Rambler Rd., Lexington, KY (US) 40503

( * ) Notice: Subject to any disclaimer, the term of this patent is extended or adjusted under 35 U.S.C. 154(b) by 772 days.

(21) Appl. No.: 10/421,513

(22) Filed: Apr. 22, 2003

(65) Prior Publication Data

US 2004/0213324 A1    Oct. 28, 2004

(51) Int. Cl.
*H04L 7/02* (2006.01)
*H03D 3/24* (2006.01)

(52) U.S. Cl. .................. 375/373; 375/374; 375/375; 375/376; 375/362; 327/141; 327/147; 327/154; 327/155; 327/156

(58) Field of Classification Search .......... 375/130, 375/141, 142, 149, 146, 133, 147, 354, 359, 375/362–364, 371, 373–376; 327/141, 145–147, 327/151, 154–156, 160
See application file for complete search history.

(56) References Cited

U.S. PATENT DOCUMENTS

| | | | | |
|---|---|---|---|---|
| 4,618,966 A | * | 10/1986 | Stepp et al. | 375/303 |
| 4,868,428 A | * | 9/1989 | Cooper | 327/248 |
| 5,184,350 A | * | 2/1993 | Dara | 370/466 |
| 5,268,935 A | * | 12/1993 | Mediavilla et al. | 375/372 |
| 5,465,071 A | * | 11/1995 | Kobayashi et al. | 329/315 |
| 5,488,627 A | | 1/1996 | Hardin et al. | |
| 5,610,955 A | | 3/1997 | Bland | |
| 5,631,920 A | | 5/1997 | Hardin | |
| 5,710,524 A | | 1/1998 | Chou et al. | |
| 5,736,893 A | | 4/1998 | Puckette et al. | |
| 5,834,979 A | * | 11/1998 | Yatsuka | 331/1 R |
| 5,943,382 A | | 8/1999 | Li et al. | |
| 5,978,415 A | * | 11/1999 | Kobayashi et al. | 375/230 |
| 6,014,063 A | * | 1/2000 | Liu et al. | 331/78 |
| 6,046,646 A | | 4/2000 | Lo et al. | |
| 6,069,922 A | * | 5/2000 | Dyke | 375/285 |

(Continued)

OTHER PUBLICATIONS

Jonghoon Kim et al. "Dithered Timing Spread Spectrum Clock Generation for Reduction of Electromagnetic Radiated Emission from High-Speed Digital System" Paper at IEEE International Symposium on Electromagnetic Compatibility, pp. 413-418, (Aug. 19-23, 2002) Minneapolis, Minnesota.

*Primary Examiner*—David C Payne
*Assistant Examiner*—Linda Wong
(74) *Attorney, Agent, or Firm*—Michael T. Sanderson; John Victor Pezdek

(57) ABSTRACT

For EMI reduction the current modulation profile is preferably used for frequencies over 1 GHz while the frequency deviation is increased at least to ±2.5 MHz and the modulation frequency is increased to at least 150 kHz, preferably about 260 kHz. In an alternative embodiment, the modification frequency is 1 MHz or greater so that a segmented spectrum is achieved. For clocks having basic frequency below 1 GHz, but having strong harmonics higher than 1 GHz, modulation of the foregoing is combined with the slower modulation currently used. EMI reduction is realized both at the lower and the higher harmonics.

19 Claims, 10 Drawing Sheets

U.S. PATENT DOCUMENTS

| | | |
|---|---|---|
| 6,167,103 A | 12/2000 | Hardin |
| 6,175,259 B1 | 1/2001 | Mann et al. |
| 6,194,903 B1 * | 2/2001 | Schulz ................. 324/661 |
| 6,292,507 B1 * | 9/2001 | Hardin et al. ............. 375/130 |
| 6,294,936 B1 | 9/2001 | Clementi |
| 6,351,485 B1 | 2/2002 | Soe et al. |
| 6,356,302 B1 * | 3/2002 | Kawakami et al. ......... 348/193 |
| 6,366,174 B1 | 4/2002 | Berry et al. |
| 6,373,306 B1 | 4/2002 | Mann et al. |
| 6,404,249 B2 | 6/2002 | Hayashida |
| 6,404,834 B1 | 6/2002 | Hardin et al. |
| 6,483,880 B2 * | 11/2002 | Moriyama ............... 375/271 |
| 6,647,052 B2 * | 11/2003 | Hailey .................... 375/130 |
| 6,678,511 B2 * | 1/2004 | Hwang et al. ............. 455/307 |
| 6,697,416 B1 * | 2/2004 | Jennings ................. 375/130 |
| 6,798,303 B2 * | 9/2004 | Steinecke et al. ........... 331/78 |
| 6,873,218 B2 * | 3/2005 | Khlat ..................... 332/103 |
| 7,068,397 B2 * | 6/2006 | Sugano et al. ............ 358/409 |
| 2003/0219082 A1 * | 11/2003 | Tanaka et al. ............ 375/324 |
| 2004/0258193 A1 * | 12/2004 | Mukaide .................. 377/47 |

* cited by examiner

HIGH FREQUENCY SPREAD SPECTRUM CLOCK GENERATION

TECHNICAL FIELD

This invention relates to the field of digital circuits, and more particularly, to spread spectrum clock circuits operable at high frequencies having reduced measurable electromagnetic interference (EMI) emissions.

BACKGROUND OF THE INVENTION

Spread spectrum clocking is now widely used in the form introduced by U.S. Pat. No. 5,488,627, assigned to the assignee to which this invention is assigned. U.S. Pat. No. 5,631,920, also assigned to the assignee to which this invention is assigned, is directed to digital implementation and control of such circuits. U.S. Pat. No. 6,404,834, also assigned to the assignee to which this invention is assigned, is to spread spectrum clock signals which are segmented by at least 10 dB reductions so as to meet certain proposed CISPR-22 rules.

As processor clock speeds continually increase, the need for methods to mitigate electromagnetic interference (EMI) become more important. Previous methods have been designed for clocks operating below 1 gigahertz (GHz) where the primary emissions are also below 1 GHz. At the current frequencies a bandwidth of 120 kHz was considered indicative of EMI level and measurement was made at that bandwidth.

At frequencies above 1 GHz a bandwidth of 1 megahertz (MHz) is currently considered indicative of EMI, and measurement at 1 MHz bandwidth is required by the Federal Communication Commission (FCC). CISPR, the European regulatory commission is proposing similar regulations. Current implementation of spread spectrum clocking provides little EMI reduction for clock harmonics above 1 GHz.

Accordingly, modifying current aspects of spread spectrum clock generation to accommodate the higher frequencies is needed. Modification which accommodates both the higher frequencies and lower frequencies from the same clock source is required, even with some compromise from the ideal for higher and lower frequencies.

The output of the spread spectrum clock generator is determined by the waveform used to angle modulate a clock circuit. One skilled in the art would recognize that angular modulation could be described in terms of either phase modulation (PM) or frequency modulation (FM). Also, a phase shifter circuit or a frequency modulator circuit may be used. The derivative of a phase modulation waveform will result in a frequency modulation waveform. When a phase modulation waveform is applied to a phase shifter circuit and a frequency modulation waveform, which is the derivative of the phase modulation waveform, is applied to a frequency modulation circuit, both circuits will have identical outputs.

With the introduction of new modulation characteristics, it is required to make modifications to the methods and circuits that provide the spread spectrum clock generation output. Various modifications and improvements are also required to some cited patents to be able to perform the desired function with a minimal number of circuits.

DISCLOSURE OF THE INVENTION

The widely used preferred modulation profile introduced in the foregoing U.S. Pat. No. 5,488,627 remains preferred for harmonics over 1 GHz in accordance with this invention while the frequency deviation is increased to be wider than the measurement bandwidth and the modulation frequency is increased to at least 150 kHz, preferably about 260 kHz. In an alternative embodiment, the modulation frequency is 1 MHz or greater so that a segmented spectrum is achieved in accordance with the foregoing U.S. Pat. No. 6,404,834.

For clocks having a fundamental frequency below 1 GHz, but having strong harmonics higher than 1 GHz, the foregoing modulation is superimposed on or otherwise combined with the slower modulation currently used. EMI reduction is realized both at the lower and the higher harmonics.

A number of modulation profiles will give some EMI reduction, which can be described by spectral characteristics of the modulation. Different methods or circuits may limit what profile may be reproduced. The most popular methods to produce an angular modulated output are a phase locked loop (PLL), delay locked loop (DLL), direct digital synthesizer (DDS) or other phase shifting method. A PLL has a number of elements that can be used to multiply an input frequency by a ratio of two numbers N(t)/M(t) where N and M may take on any positive value from 1 and up. The PLL also has a detector, pumped source, filter, and controllable oscillator. All of the aforementioned functions have predetermined parameters, programmable parameters, or may be self-adjusted during operation to create an optimized EMI reduction. There are a plurality of circuits that can be used for the N(t) and/or M(t) functions. Some implementations are used to provide maximum flexibility, which use additional integrated circuit (IC) area and other implementations have reduced flexibility which use minimized IC area.

BRIEF DESCRIPTION OF THE DRAWINGS

The details of this invention will be described in connection with the accompanying drawings, in which.

DESCRIPTION OF THE PREFERRED EMBODIMENTS

Figure 1:
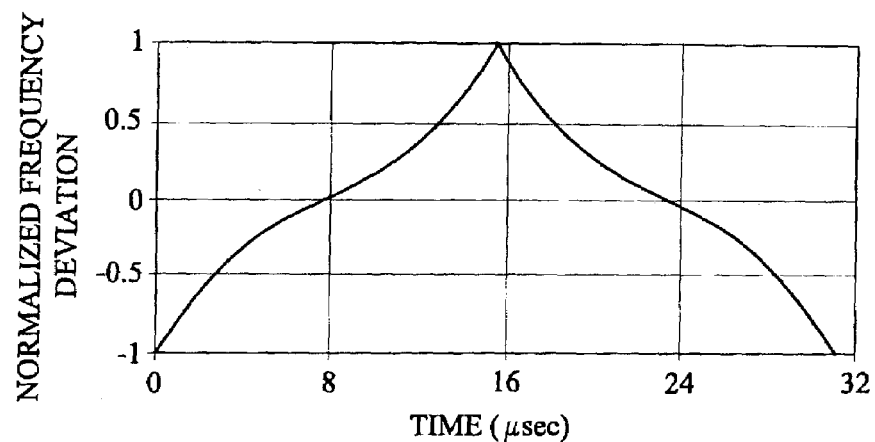
FIG. 1 illustrates the current spread spectrum clock generation modulation, which modulation has an example of the currently preferred profile.
Figure 2:
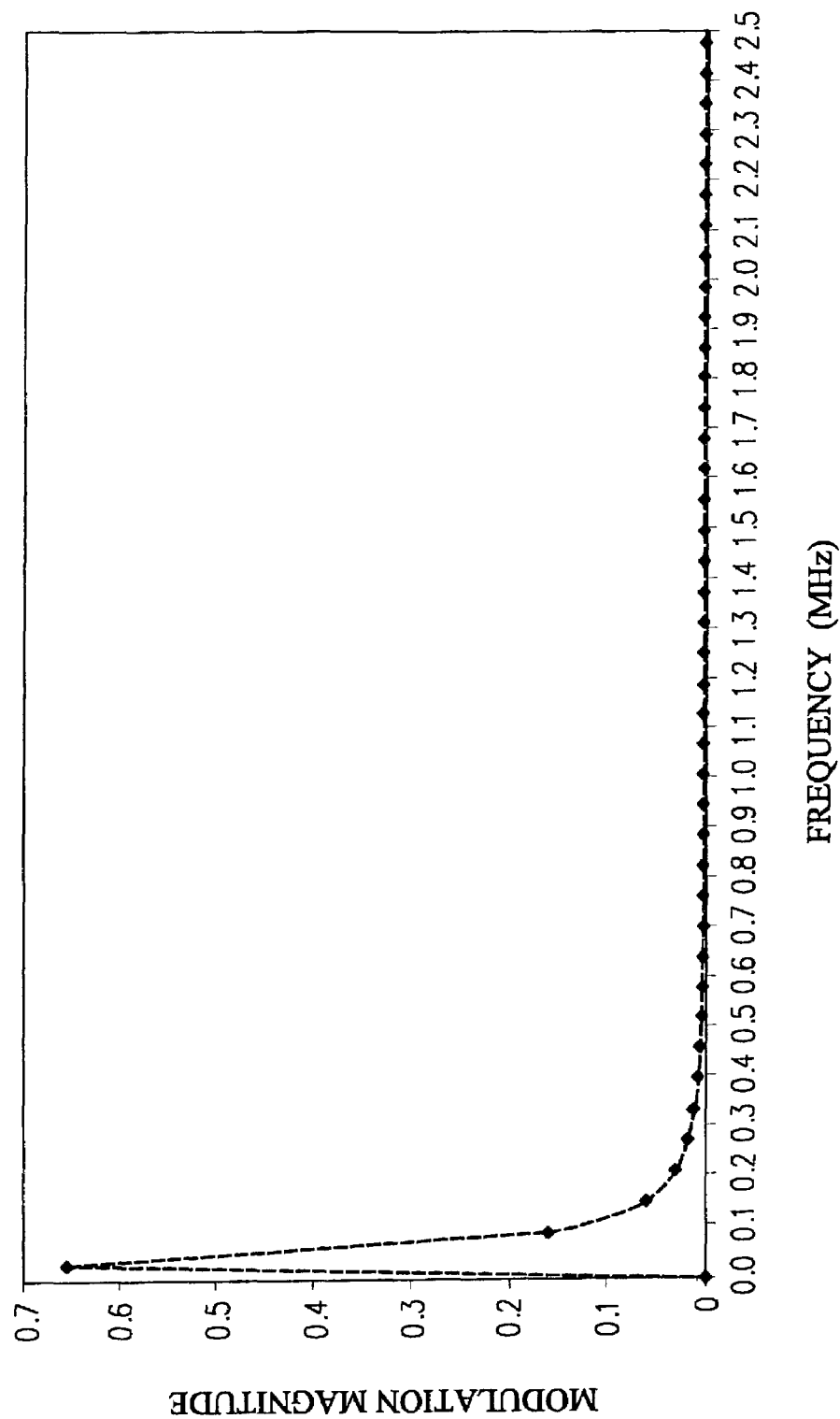
FIG. 2 illustrates a representative spectral content resulting from an implementation of the FIG. 1 profile obtained from Fourier transform analysis as an odd mathematical function.

One implementation is a modification of current, non-segmented spread spectrum clock generation. The current modulation with preferred profile is shown in FIG. 1. Currently the industry uses modulation frequencies of from 30 kHz to 150 kHz. The frequency deviation (extent of clock frequency from nominal) creates harmonics that are typically wider than the measurement bandwidth so that less energy is measured at any give point. FIG. 2 shows the spectral content of the modulation waveform resulting from the FIG. 1 profile at modulation frequency of about 32 kHz obtained by Fourier series or transform. The vertical, magnitude scale is representative of various embodiments and pertinent for it relative size of frequencies. The horizontal scale is output signal frequency. The odd harmonics of the modulation profile are shown as data points because the even harmonics are zero since the profile is shown as an odd mathematical function. It should be understood that if the function was redrawn at a different starting time both even and odd harmonics will be present with no change in functionality. This is also true for any other spectral analysis in this application.

Once a radiated emission is above 1 GHz in frequency, FCC rules and proposed CISPR rules dictate that a wider measurement bandwidth of 1 MHz be used to measure electromagnetic emissions for systems with a fundamental clock frequency greater than 108 MHz. In order to receive the same attenuation benefits above 1 GHz as enjoyed below 1 GHz, the modulation frequency must be adjusted to compensate. This compensation is a linear extrapolation of current modulation frequency such that it follows the expansion of the required measurement bandwidth. Since the measurement bandwidth was increased from 120 kHz to 1 MHz, or by a factor of 8.33 (i.e., 1 MHz divided by 120 kHz=8.33). It follows that in order to achieve the same attenuation with this new measurement bandwidth the modulation frequency and deviation must be multiplied by the same amount. This concept was proven by the following experiments.

TEST EXAMPLE 1

A 1 GHz clock was modulated under standard EMI reduction conditions as follows:

Modulation frequency—31.25 kHz.

Preferred profile (introduced in the foregoing U.S. Pat. No. 5,488,627, this profile is convex at frequencies lower that the nominal and concave at frequencies higher than the nominal, thereby forming an abrupt transition or cusp at the outer frequencies). (Although preferred, this invention is believed applicable to any operative profile.)

Deviation—±300 kHz (±0.03%)

Bandwidth of measurement—120 kHz. and 1 MHz.

Figure 3:
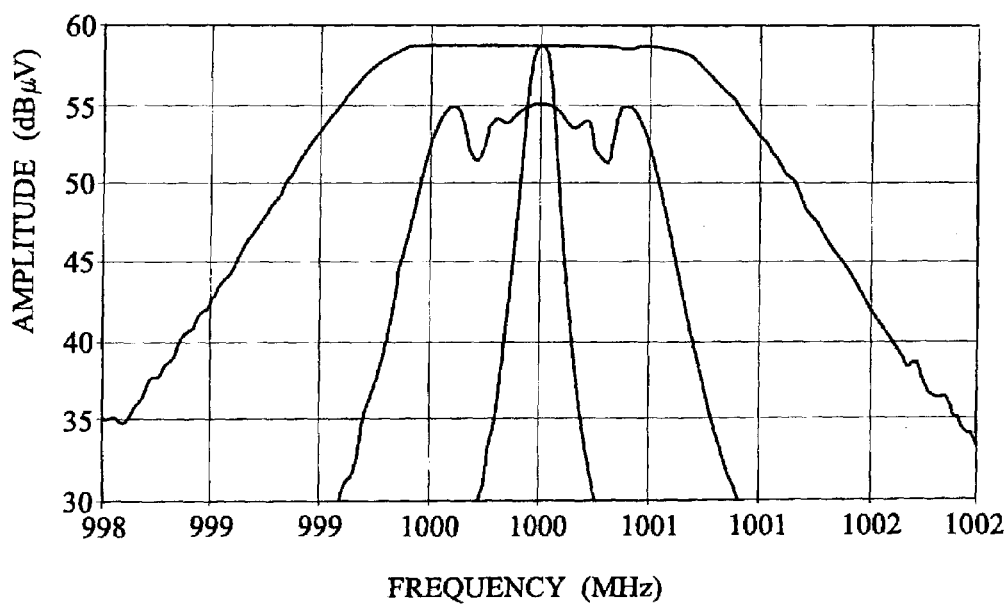
FIG. 3 illustrates the attenuation resulting from Test Example 1.

The results are shown in FIG. 3. Without modulation the clock of the foregoing had a measured amplitude of 58.89 dBµV (central curve). After modulation of the foregoing at measurement bandwidth of 120 kHz the highest point in the spread spectrum harmonic measured 55.25 dBµV for 3.64 attenuation (middle curve). After modulation of the foregoing at measurement bandwidth of 1 MHz the resulting attenuation was 0 dB since the spread spectrum clock fit entirely within the measurement window (widest curve).

TEST EXAMPLE 2

Figure 4:
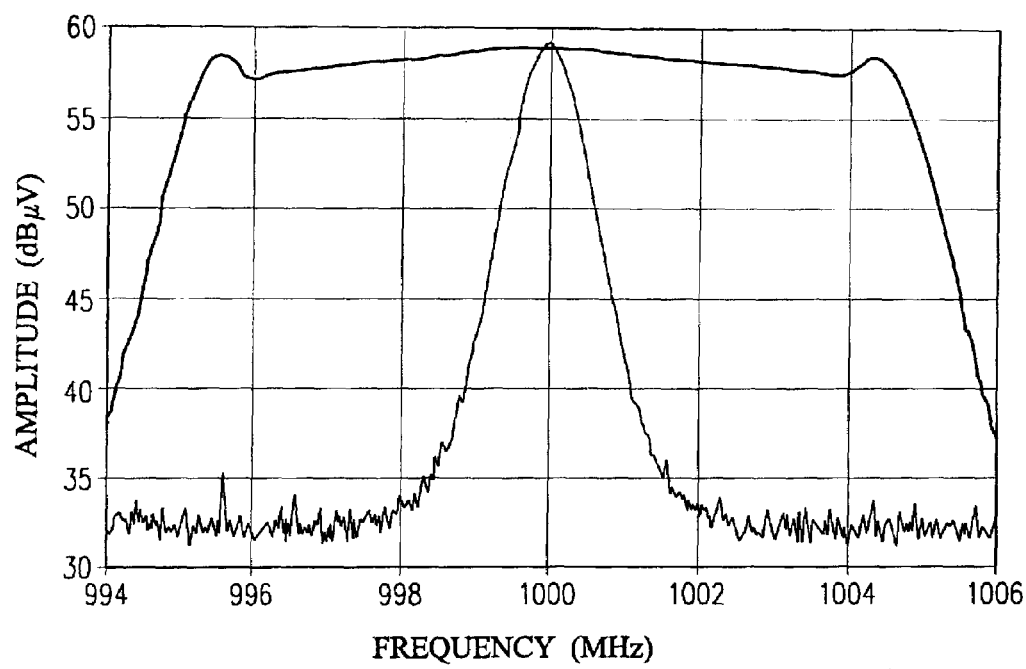
FIG. 4 illustrates the attenuation resulting from Test Example 2.

The foregoing Test Example 1 was modified by increasing the deviation alone by 8.33 times for a deviation of ±2.5 MHz (±0.25%). The results are shown in FIG. 4. The resulting measurement of the modulated clock was 58.76 dBuV (wide curve). The unmodulated clock measured 59 dBµV (central curve). (The tiny variation from the previous measurement was due to the time between measurements.) This gives a negligible attenuation of only 0.24 dB.

In order to achieve greater attenuation, a much wider deviation would need to be used.

Operative Example

The foregoing Test Example 2 was modified by increasing the modulation frequency by 8.33 times as follows:

Clock nominal (center) frequency—1 GHz.

Modulation frequency—260 kHz.

Profile (as foregoing Test Examples).

Deviation—±2.5 MHz (±0.25%).

Bandwidth of measurement—1 MHz.

Figure 5:
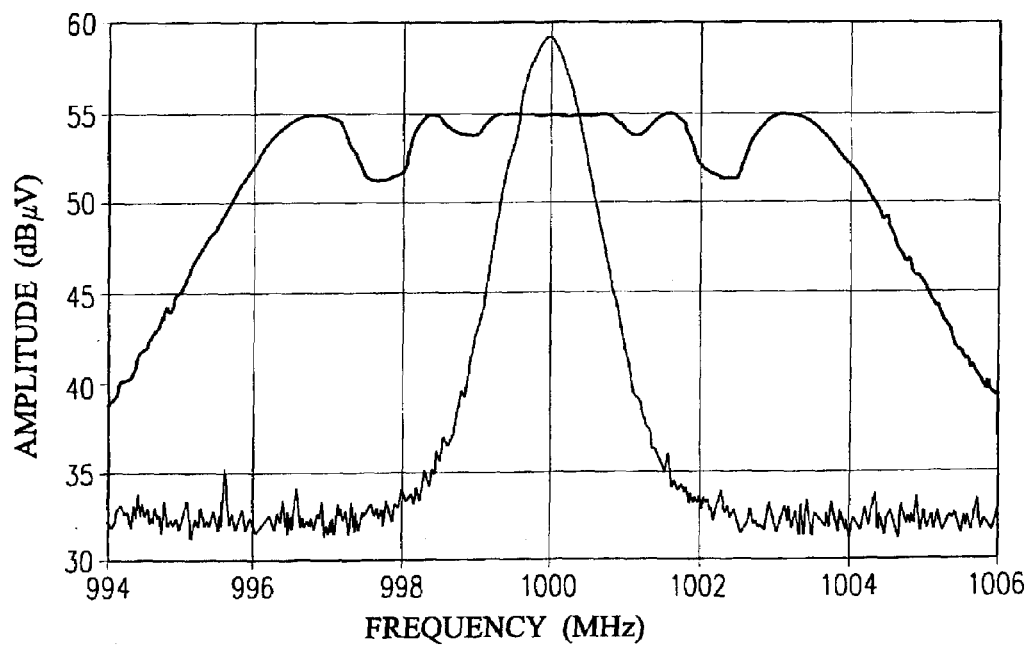
FIG. 5 illustrates the attenuation resulting from an Operative Example.

The results are shown in FIG. 5. The unmodulated clock measured 58.76 dBµV (central curve) and the modulated clock measured 55.13 dBµV (wide curve). This results in an attenuation of 3.63 dB. Therefore, by multiplying the deviation and the modulation frequency by 8.33 the same benefits of current spread spectrum clocking technology can be extended to clocks operating above 1 GHz, as well as any circuits driven by the clock.

Figure 6:
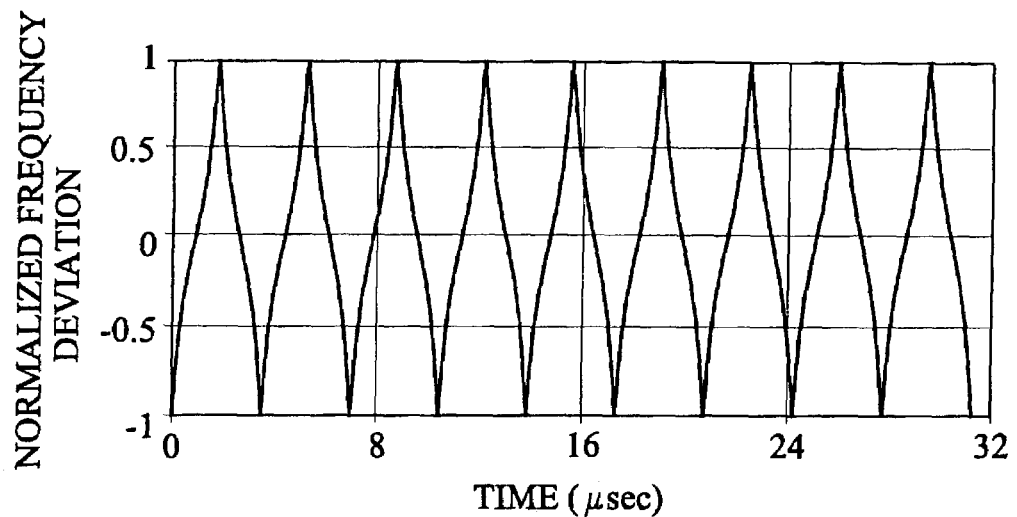
FIG. 6 illustrates high frequency spread spectrum clock generation modulation to be combined with the modulation illustrated in FIG. 1.
Figure 7:
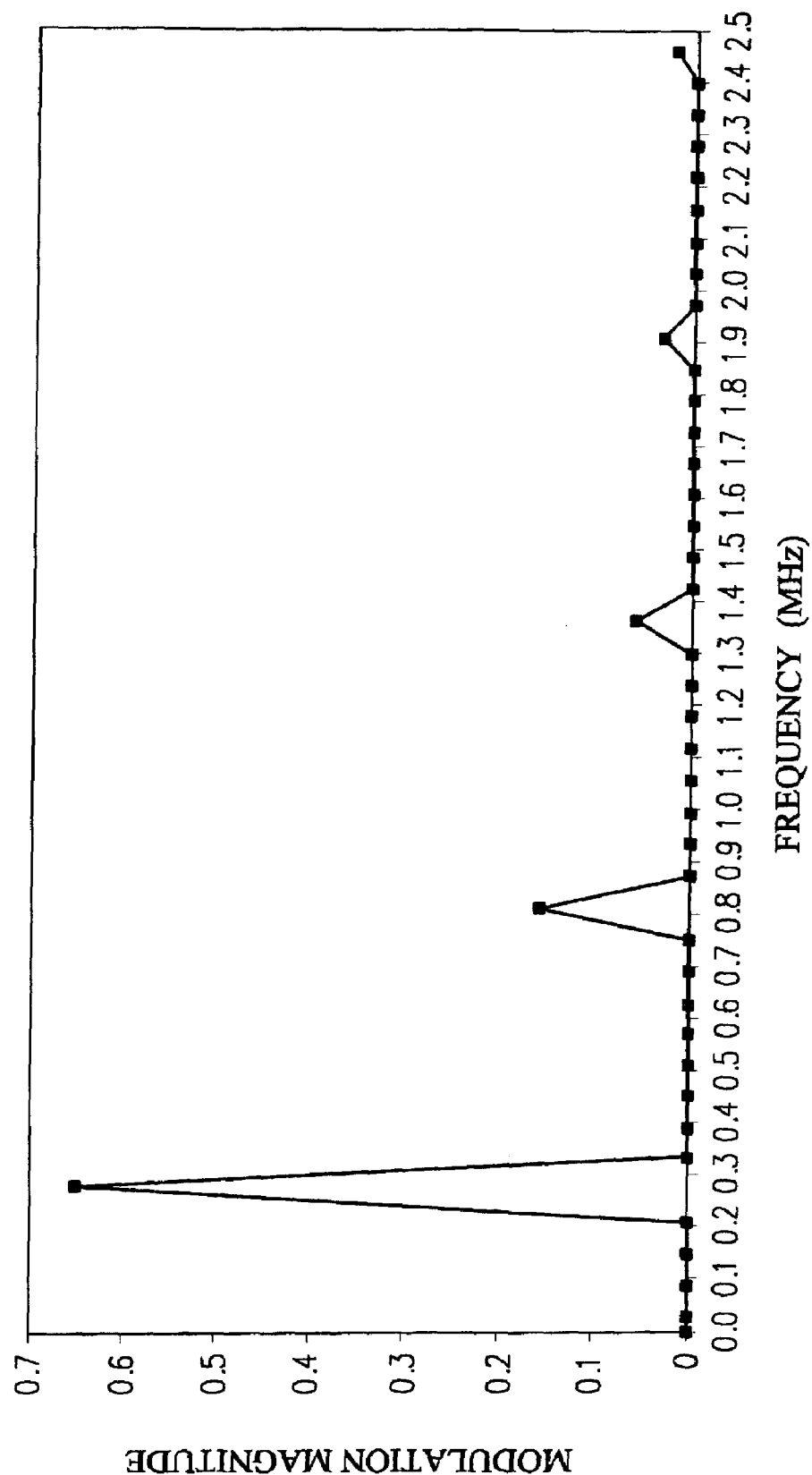
FIG. 7 illustrates a representative spectral content resulting from an implementation of the FIG. 6 profile obtained from Fourier transform analysis as an odd mathematical function.

For modulation frequencies around 260 kHz, the foregoing preferred profile works the best. FIG. 6 shows a modulation profile that is 9 times the modulation frequency as compared to FIG. 1. The spectral representation 2 of the modulation profile is found in FIG. 7. The illustration of FIG. 7 is directly comparable to that of FIG. 2.

Other modulation profiles also provide attenuation benefits, especially as the modulation frequency increases. Therefore, the preferred profile, triangular profile (symmetric and unsymmetric), stepped triangular, exponential (sharkfin in form), sinusoidal and other operative profiles might all be used. The modulation frequency range should be between 150 kHz and 1 MHz, with the best frequency known being 260 kHz. Another description would be that the spectral response of the frequency modulation has a fundamental harmonic or initial energy in the 150 kHz to 1 MHz band with the preferred location around 260 kHz.

A second implementation is based on segmentation as disclosed in the foregoing U.S. Pat. No. 6,404,834. The clock is modulated at a higher rate than the bandwidth of the measuring device. This has the effect of only having one subharmonic present within the receiver measurement bandwidth at one time, since the spectrum appears as many narrowband harmonics instead of a single broadband clock harmonic.

CISPR is now proposing a new receiver setting for measuring frequencies about 1 GHz. This new CISPR22 receiver has measurement bandwidths of 1 MHz instead of 120 kHz. To maintain the characteristics of a segmented spectrum clock, the modulation frequency needs to be increased in order to keep only a single subharmonic at a time within the measurement window. As such, the new modulation ranges for harmonics above 1 GHz clock operation from 1 MHz to as great as 11.162 MHz. Higher modulation frequencies may be used, but as modulation frequency increased, the difficulty of tracking the clock increases.

A third embodiment is applicable to clock frequencies higher than those common currently, but less than 1 GHz. In the near future it can be expected that such clock frequencies, such as 500 MHz, will be used commercially in common devices such as printers. Such clocks will have very significant harmonics above 1 GHz.

Figure 8:
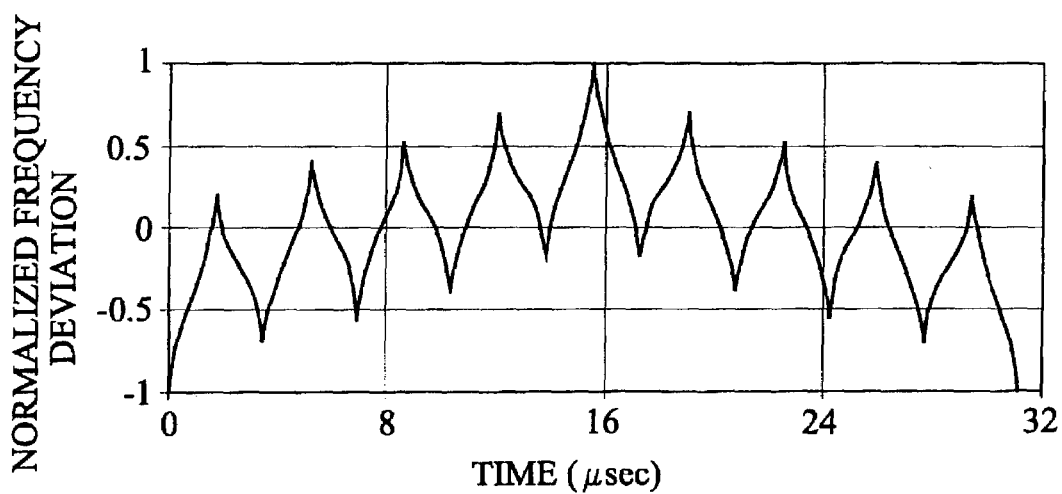
FIG. 8 illustrates a profile resulting from the addition of a slow profile and a fast profile.

This embodiment introduces the increased deviation and fast modulation described in the foregoing as a component of the standard modulation to the clock operating below 1 GHz creating a dual modulation profile. FIG. 1 shows the current typical 32 kHz operating in the preferred profile discussed in the foregoing. FIG. 6 shows the high frequency profile to be added to standard modulation. FIG. 8 shows the combined profile.

The combined profile may be described mathematically as follows:

$$c(t)=A(t) \times M1(\omega \times t)+B(t) \times M2(k \times \omega \times t+\phi)$$

Where: x denotes multiplication,

A is a factor defining the frequency deviation of the slower profile,

B is a factor defining the frequency deviation of the faster profile,

ω is a constant defining the angular frequency of the slow profile, k is the factor by which the angular frequency of the fast profile differs from the angular frequency of the slow profile, M1 is a periodic function of time defining the slow profile, M2 is a periodic function of time defining the fast profile, and φ is a constant defining the phase difference between the fast and the slow profiles.

Figure 12:
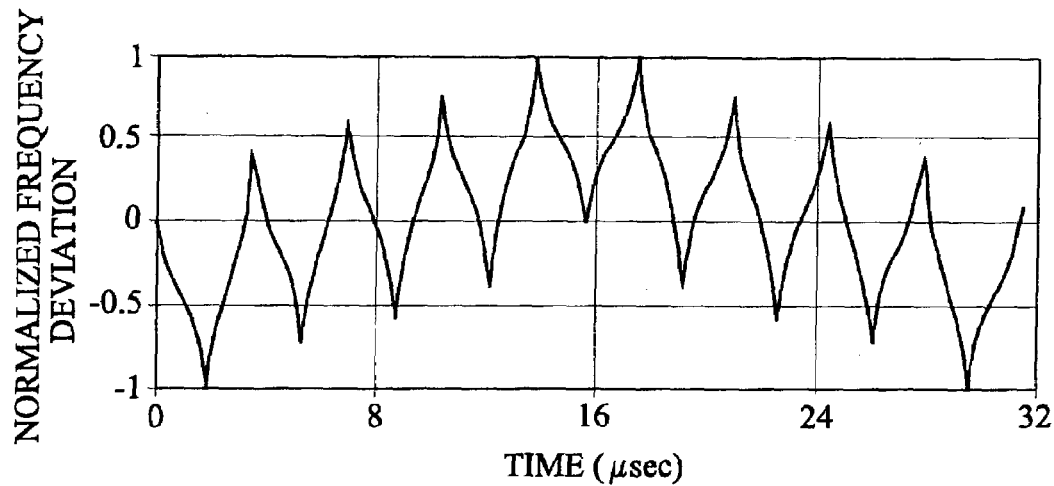
FIG. 12 illustrates the profile of FIG. 8 except that the phase is 180 degrees different.

While A and B are shown as time-varying quantities, in many applications they will be preferred as constants. Similarly, generally there is little technical advantage in having the phase between the fast profile and the slow profile change with time. However there is some advantage of setting the phase such that the profile in FIG. 12 is achieved. Since in that profile the peak deviation of the slower profile happens at the negative peak of the faster profile, the total deviation can be increased to be normalized again. This additional deviation increases the attenuation by a few dB. Since the frequency deviations produced by A and B are additive, normally, each should be smaller than a system which employs only a single profile.

Accordingly, a formula representing a generally preferred range of implementations is as follows:

$$c(t)=0.5 \times M1(2 \times \pi \times 31.25 \text{ kHz} \times t)+0.5 \times M2(9 \times 2 \times \pi \times 31.25 \text{ kHz} \times t+\pi)$$

Figure 9:
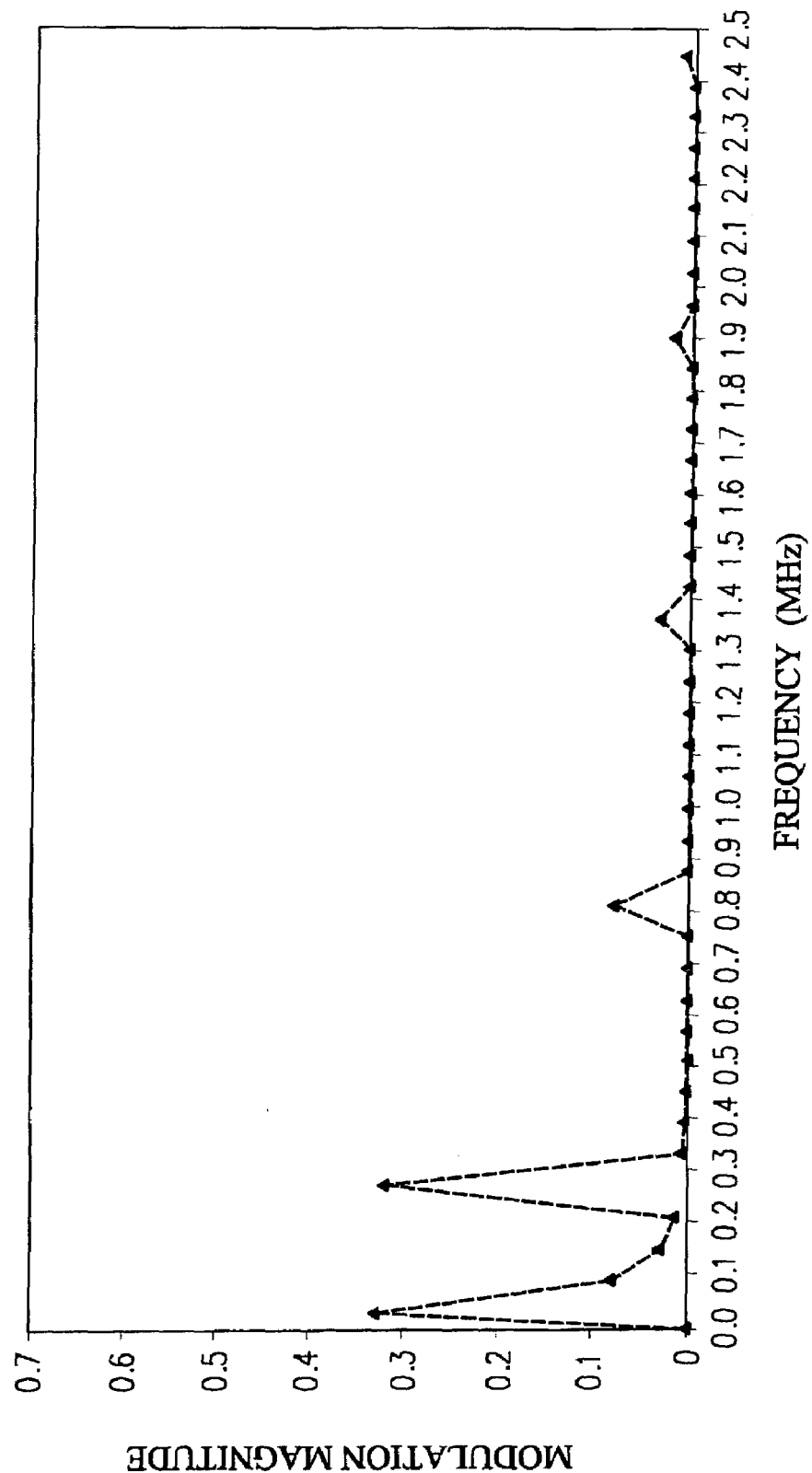
FIG. 9 illustrates a representative spectral content resulting from and implementation of the FIG. 8 profile obtained from Fourier transform analysis as an odd mathematical function.

The foregoing, by having A and B constant and equal, represents an equal weighting of the slow profile and the fast profile. The slow profile has the generally preferred frequency of 31.25 kHz. More generally, the slow profile has a deviation of frequency of at least about 300 kHz and a modulation frequency of between about 30 kHz and 150 kHz. The fast profile is an integral number (9) greater frequency than the slow profile to minimize effects of phase. Other integer values may be used as well as non-integer values. The resulting profile depending on φ is shown in FIG. 8 or FIG. 12. The spectral representation of the dual modulation profile is found in FIG. 9. It is important to note that all existing prior art have spectral characteristics very similar to FIG. 2 and that the invention here has energy with the fundamental harmonic in the mentioned higher modulation frequency range. FIG. 9 shows uniquely that the dual modulation profile has increased energy at higher frequencies regardless of profile shape.

Figure 10:
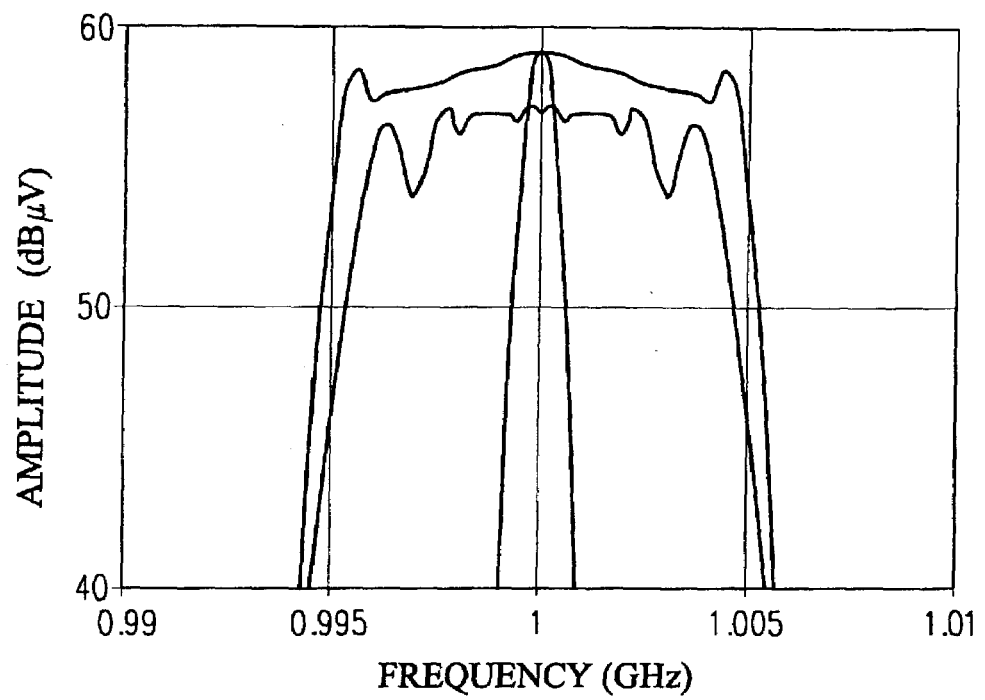
FIG. 10 illustrates attenuation resulting from the addition of a slow profile and a fast profile and measurement bandwidth of 1 MHz.

FIG. 10 shows a comparison of the attenuation achieved by a 1 GHz spread spectrum clock with a typical 32 kHz modulation (high, wide curve) and the attenuation by using the combined modulation technique described with respect to FIG. 6 (lower, wide curve). The central curve is for the clock unmodulated. The modulated results of FIG. 10 are for measurement bandwidth of 1 MHz, as required for measuring radiated emissions above 1 GHz. The combined modulation technique (the lower curve) has an attenuation of 1.804 dB, whereas using the traditional spread spectrum clock generation technique results in only an attenuation of 0.118 dB (the higher curve).

Accordingly, the combined modulation technique shows more than 15 times more attenuation in dB than the traditional technique at this measurement bandwidth. As the frequency of measurement is increased, the attenuation should increase by approximately 10 dB with each decade. For example, at 10 GHz the attenuation of the new profile should be about 12 dB better than that using the traditional technology.

Figure 11:
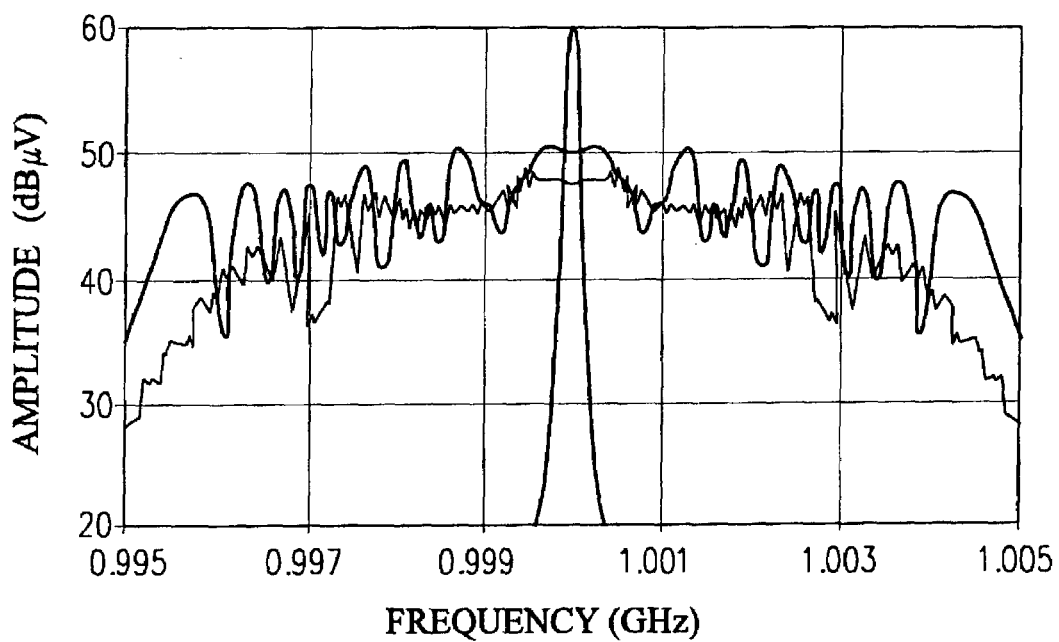
FIG. 11 illustrates attenuating resulting from the system for which the results are shown in FIG. 10 except that the measurement bandwidth is 120 kHz.

FIG. 11 is identical to FIG. 10 in origin except the measurement bandwidth is 120 kHz, as required for measuring signals below 1 GHz. In FIG. 11 the center curve is without modulation and the lowest curve is with the traditional modulation. The wide, higher curve is for the combined modulation. As expected, the traditional spread spectrum clock generation technique outperforms the combined modulation technique, albeit not by much.

The traditional technique results in 11.88 dB attenuation. The combined technique only attenuated 8.67 dB. At this measurement bandwidth, the traditional technique outperforms the combined technique by 1.37 times in terms of dB. This shows that for a small degradation in attenuation below 1 GHz, more attenuation can be gained above 1 GHz.

In the foregoing system, some improvement can be realized by adjusting the phase. FIG. 12 illustrates the additive profile of FIG. 8 except that the phase is displaced 180 degrees. Similarly, changing of k, the high frequency multiplier, can provide improvements.

TABLE 1

| k = 8; -- Measurement Bandwidth = 120 kHz | |
|---|---|
| Phase Displacement (FIG. 8 = 0 | Attenuation (dB) |
| 0 | 10.41 |
| 90° | 9.78 |
| 180° | 8.30 |
| 279° | 9.66 |

TABLE 2

| k = 8; -- Measurement Bandwidth = 1 MHz | |
|---|---|
| Phase Displacement (FIG. 8 = 0 | Attenuation (dB) |
| 0 | 1.80 |
| 90° | 1.80 |
| 180° | 1.33 |
| 279° | 1.80 |

TABLE 3 k = 9; -- Measurement Bandwidth = 120 kHz

| Phase Displacement (FIG. 8 = 0 | Attenuation (dB) |
|---|---|
| 0 | 8.67 |
| 90° | 10.04 |
| 180° | 10.16 |
| 279° | 9.29 |

TABLE 4 k = 9; -- Measurement Bandwidth = 1 MHz

| Phase Displacement (FIG. 8 = 0 | Attenuation (dB) |
|---|---|
| 0 | 1.80 |
| 90° | 2.06 |
| 180° | 2.06 |
| 279° | 2.19 |

As the Tables 1-4 show, there can be significant differences in attenuation by change the fast modulation speed, the phase, or both.

Figure 13:
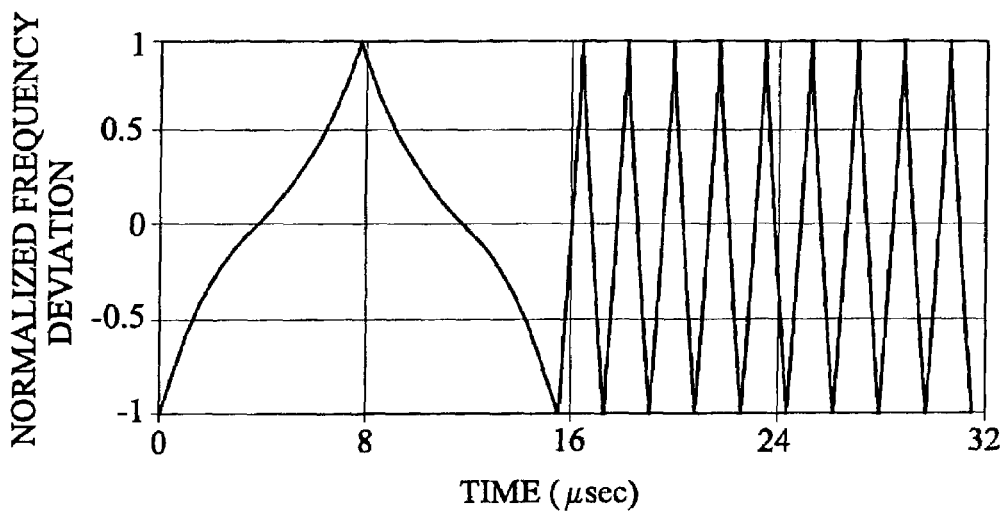
FIG. 13 illustrates a combination of fast and slow profiles alternating in time.

Another implementation of combined slow and fast modulations is to alternate them rapidly in time. This is illustrated in FIG. 13. Such discrete modulation may be at equal, regular intervals, as suggested by FIG. 13, or may favor one of the profiles more than another, depending upon the requirements of the system being attenuated.

Such discrete modulation does not perform as well as the additive modulation, but does have some benefit. With a 1 MHz measurement bandwidth, the attenuation using this variation is 1.2 dB. With a 120 kHz measurement bandwidth, the attenuation is 8.92 dB. Measurements were performed on a 1 GHz clock with 10 MHz wide deviation, just as for the preceding combined profile measurements.

Figure 14:
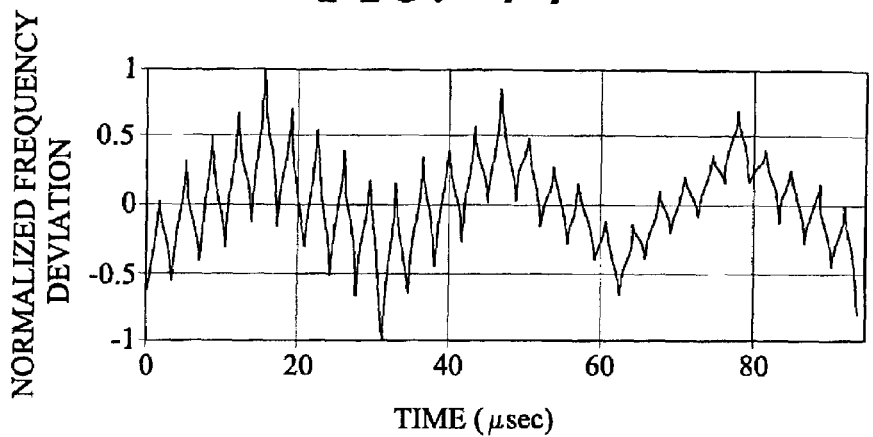
FIG. 14 illustrates an addition of a slow profile and a fast profile with time varying of modulation amplitude.

Another variation is to make the B(t) term vary with time. For evaluation of this variation, all aspects of the additive example in the foregoing discussed in connection with FIG. 8 except B(t)=[1+0.5×sin(2×π×96 kHz×t)]. The resulting waveform is shown in FIG. 14. A 0.4 dB attenuation was achieved with a 1 MHz measurement bandwidth, and 6.16 with 120 kHz measurement bandwidth.

As with the single profile embodiments, the combined profile embodiments are not confined to the preferred profile, but the combined profile is believed applicable to any profile.

Figure 15:
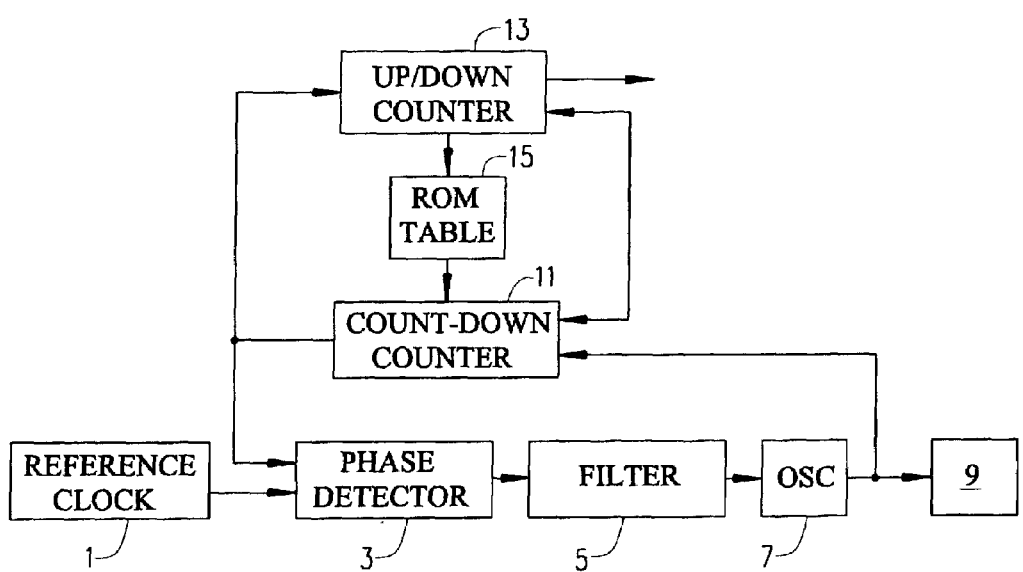
FIG. 15 illustrates an illustrative hardware implementation, labeled prior art with respect to the hardware shown.

A basic, illustrative implementation of this invention is shown in FIG. 15, which is closely based on FIG. 8 of the foregoing U.S. Pat. No. 5,631,920. Although FIG. 15 is labeled "Prior Art," that is with respect to the hardware shown. It is not prior art when the memory contents implement this invention.

FIG. 15 has a reference clock 1, which this invention addresses when the frequency is higher than previous frequencies, such as 1 MHz. Reference clock 1 provides one input to phase detector 3. The output of phase detector 3 provides the input to a filter 5 to operatively pass low frequency signals. The output of filter 5 provides the control input to voltage controlled oscillator 7.

The output of the voltage controlled oscillator, which is a digital signal, is connected as the operative clock source to an electronic device 9, such as a printer or an electronic data processor. The output of oscillator 7 is also connected as an input to count-down counter 11.

The output of count-down counter is connected as the second input to phase detector 3, thereby forming in a well known manner a phase locked loop. Another output of count down counter is connected as a control input to up or down counter 13. The content of up or down counter 13 addresses different contents of a ROM or RAM member table 15. And the content of memory 15 sets the value in count-down counter 1, which is counted down. One skilled in the art would also recognize that the count-down counter 11 may be either an up or down counter.

The addressed content of memory 15 defines the profiles as discussed above. Known the characteristics of the phased lock loop establishes values toward which the frequency of oscillator 7 moves depending on the delay in the output of count-down counter 11. The desired profile can be physically graphed as an aid in selecting the values to have the output of oscillator 7 follow the desired profile.

A larger number entered into count-down counter 11 equates with an increase in the frequency of oscillator 7. Of course, in practice the responses of an exact system must be found primarily by measurement and by some trial and error, but such detail is often required in attempting to minimize EMI.

Figure 16:
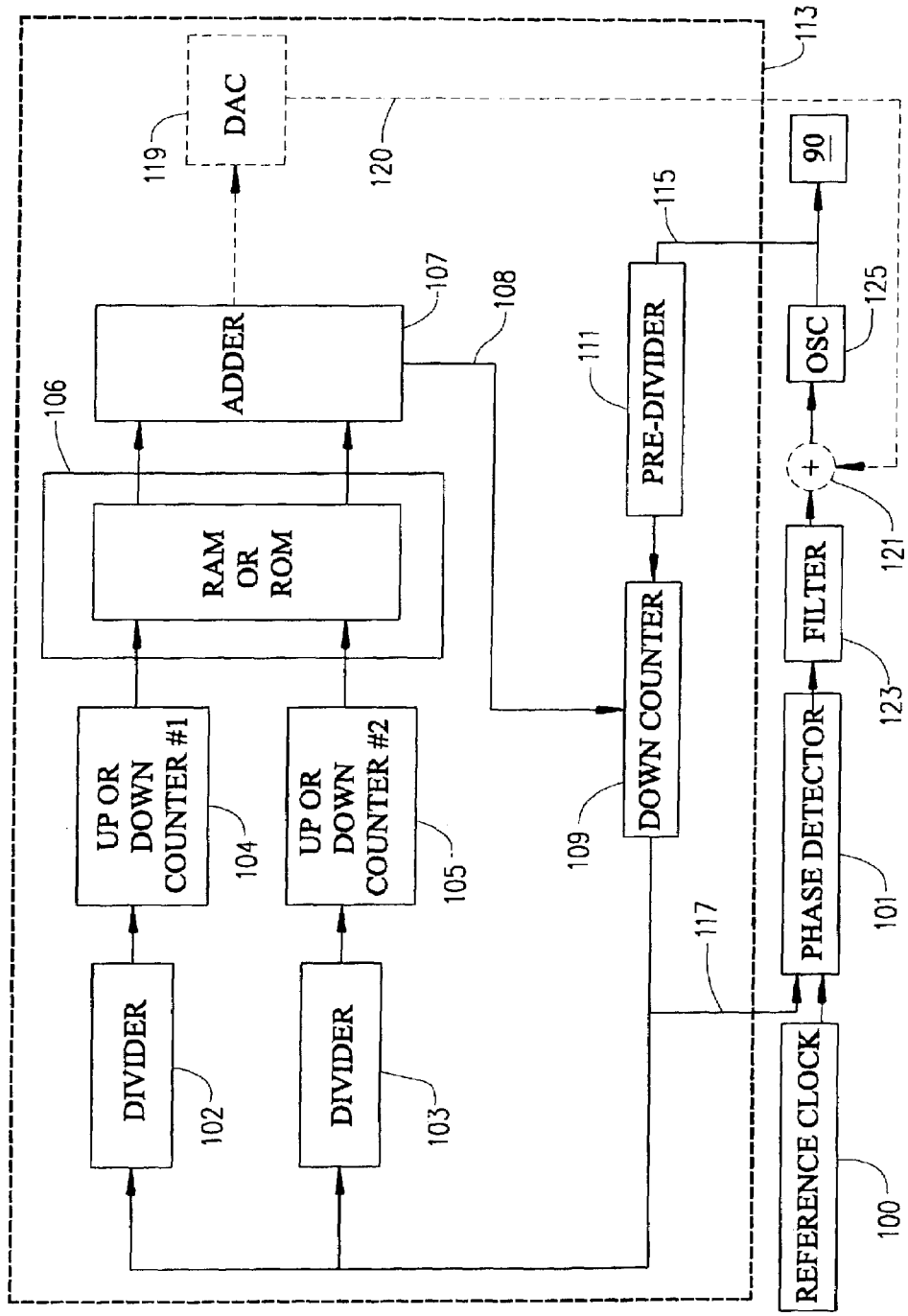
FIG. 16 illustrates an illustrative hardware implementation of design optimized for dual modulation.

The invention of the dual modulation profile lends itself to another implementation which is shown in FIG. 16 that optimizes the circuit design to reduce the circuit size. Reference clock 100, phase detector 101, filter 123 and clocked device 90 are directly comparable to elements 1, 3, 5 and 9 respectively of FIG. 15. The introduction of a four ported ROM or RAM 106 reduces the required memory size for a particular case where A and B constants are set at 0.5. The combination of divider 102 and up or down counter 104 creates addresses for the RAM or ROM 106 to provide the slow rate of modulation to adder 107. Likewise, the combination of divider 103 and up or down counter 105 creates addresses for the RAM or ROM 106 to provide the fast rate of modulation to adder 107.

The resulting sum from adder 107 is supplied to down counter 109 to determine the feedback divider value for the PLL. The pre-divider 111 receives the digital output of the voltage controlled oscillator OSC 125 and divides this rate by a predetermined value. The output of the pre-divider 111 supplies the clock input of down counter 109. The pre-divider 111 is used to reduce the dynamic range of the values in the RAM or ROM 106 if necessary. If the predetermined value for the pre-divider 111 is 1 then this element can be deleted.

The four ported RAM or ROM 106 may be substituted by two devices which allow compete flexibility of A and B or M1(t) and M2(t). It is also understood that one skilled in the art can use the features introduced by the foregoing U.S. Pat. No. 6,404,834, FIG. 3, to give greater flexibility.

The collection of elements illustrated as inside of dashed area 113 is together referred to as the PLL modulator with an input 115 and output 117. This modulator can be placed in the reference circuit to be a feedforward modulator as well or in both feedforward and feedback at the same time. It is also understood that if all the predetermined and programmable devices are fixed, the design can be compiled which would perform the identical function but lose all reference descriptions by becoming one block of logic.

Another implementation is to use the direct injection of the modulation into the PLL. The adder 107 output can be sent to a Digital to Analog Converter (DAC) 119 which creates an analog modulation signal 119. This modulation signal is supplied by connector 120 to the adder 121 that combines the DAC 119 output and a loop filter 123 output to become the input of a voltage controlled oscillator OSC 125. When this alternative is used the signal 108 is set to a predetermined constant value. Again, this modulation scheme may be placed in the feedforward, feedback or both paths depending on the desired characteristics or usage.

As is discussed in the foregoing, many variations and alternatives may be employed consistent with the practice of this invention.

What is claimed is:

1. An electronic data processing device, comprising:
   a reference clock;
   a phase detector for receiving an input from said reference clock;
   a filter for receiving an input from said phase detector;
   a first adder for receiving an input from said filter;
   an oscillator for receiving an input from said first adder;
   a phase locked loop modulator for receiving an input from said oscillator, said modulator having:
      a pre-divider;
      a down counter for counting down from a predetermined constant value;
      said pre-divider receiving a digital input signal from said oscillator and providing an output to a clock input of said down counter producing an output which is connected as an additional input to said phase detector;
      a memory;
      a second adder;
      a first divider;
      a first up or down counter;
      said first divider receiving said output from said down counter and providing an output to an input of said first up or down counter having an output supplied to an input of said memory for providing a slow rate of modulation signal as an input to said second adder;
      a second divider;
      a second up or down counter;
      said second divider receiving said output from said down counter and providing an output to an input of said second up or down counter having an output supplied to said input of said memory for providing a fast rate of modulation signal as another input to said second adder;
      a digital to analog converter; and
      said second adder producing an output supplied to said digital to analog converter, said digital to analog converter producing an analog modulation signal output supplied as another input to said first adder;
   and
   an operative clock to provide spread spectrum clock control output from said oscillator to a clocked device, said spread spectrum clock control output having an operative profile that has a deviation of frequency of at least plus or minus 2.5 MHz and a modulation frequency of at least 150 kHz, wherein said spread spectrum clock control output being derived from said reference clock having a frequency of less than a central frequency defining the deviation of frequency.

2. The electronic data processing device of claim 1 wherein said first divider and said first up or down counter provide addresses as inputs to said memory which provides the slow rate of modulation signal to said second adder, and said second divider and said second up or down counter provide further addresses as further inputs to said memory which provides the fast rate of modulation signal to said second adder.

3. An electronic data processing device, comprising:
   a reference clock;
   a phase detector for receiving an input from said reference clock;
   an oscillator for receiving an input from said phase detector;
   a modulator comprising:
      a pre-divider receiving a digital output of the oscillator and dividing said output by a predetermined value;
      a down counter;
      said pre-divider providing an output to a clock input of said down counter producing an output which is connected as an additional input to said phase detector;
      a memory;
      a first adder and a second adder;
      a first divider and a second divider;
      a first up or down counter and a second up or down counter;
      said first divider receiving said output from said down counter and providing an output connected as an input to said first up or down counter having an output connected as an input to said memory, said memory providing a slow rate of modulation signal output as an input to said first adder;
      said second divider receiving said output from said down counter and providing an output connected as an input to said second up or down counter having an output to said memory for providing a fast rate of modulation signal as another input to said first adder, and
      said first adder providing a resulting sum as an output value to said down counter to determine a feedback divider value for said modulator;
   and
   an operative clock to provide spread spectrum clock control output from said oscillator to a clocked device, said spread spectrum clock control output having an operative profile that has a deviation of frequency of at least plus or minus 2.5 MHz and a modulation frequency of at least 150 kHz, wherein said spread spectrum clock control output being derived from said reference clock having a frequency of less than a central frequency defining the deviation of frequency.

4. The electronic data processing device of claim 3 wherein said first divider and said first up or down counter provide addresses to said memory which provides the slow rate of modulation signal to said first adder and said second divider and said second up or down counter provide further addresses to said memory to provide the fast rate of modulation signal to said first adder.

5. A device, comprising:
   a reference clock;
   a phase detector for receiving an input from said reference clock;
   a filter for receiving an input from said phase detector;
   a first adder for receiving an input from said filter;
   an oscillator for receiving an input from said first adder;
   a phase locked loop modulator including:
      a pre-divider;
      a down counter for counting down from a predetermined value;
      said pre-divider receiving a digital output from said oscillator and providing an output to a clock input of said down counter producing an output which is connected as an additional input to said phase detector;
      at least two dividers for receiving said output from said down counter;
      corresponding at least two up or down counters receiving an output from a respective one of said at least two dividers;
      a second adder;

a digital to analog converter;
a memory receiving outputs from said at least two up or down counters for providing at least two rate of modulation signals to said second adder, said second adder producing an output supplied as an input to said digital to analog converter for providing an analog modulation signal as an output from said modulator; and
said first adder receiving as a second input said analog modulation signal from said modulator;
and
an operative clock to provide spread spectrum clock control output from said oscillator to a clocked device, said spread spectrum clock control output having an operative profile that has a deviation of frequency of at least plus or minus 2.5 MHz and a modulation frequency of at least 150 kHz, wherein said spread spectrum clock control output being derived from said reference clock having a frequency of less than a central frequency defining the deviation of frequency.

6. The device of claim 5, wherein said first adder combines said analog modulation signal and the output of filter to create the input to said oscillator.

7. The device of claim 5 wherein said at least two dividers and said corresponding at least two up or down counters comprise a first divider and a first up or down counter for providing addresses to said memory to provide a slow rate of modulation signal to said second adder and a second divider and a second up or down counter for providing further addresses to said memory to provide a fast rate of modulation signal to said second adder.

8. The device of claim 7 wherein said memory comprises a first memory device and a second memory device wherein said first divider and a first up or down counter provide said addresses to said first memory device and said second divider and a second up or down counter provide said further addresses to said second memory device.

9. The device of claim 7 wherein said memory comprises a four-ported memory device having a first input, a second input, a first output, and a second output wherein the first and second inputs respectively receive the outputs of said first and second up or down counters and said first and second outputs of said memory device are provided as an inputs to said second adder.

10. The electronic data processing device of claim 1 wherein said memory comprises a first memory device and a second memory device wherein said first divider and a first up or down counter provide said addresses to said first memory device and said second divider and a second up or down counter provide said further addresses to said second memory device.

11. The electronic data processing device of claim 1 wherein said memory comprises a four-ported memory device having a first and a second input and a first and a second output wherein said first and second inputs respectively receive said outputs of said first and second up or down counters and said first and second outputs of said memory device are provided as an inputs to said second adder.

12. The electronic data processing device of claim 2 wherein each of said address provided by said first up or down counter to said memory device designate a different modulation profile for said slow modulation signal and each of said further addresses provided by said second up or down counter to said memory device designate a different modulation profile for said fast modulation signal.

13. The electronic data processing device of claim 7 wherein each of said addresses provided by said first up or down counter to said memory device designate a different modulation profile for said slow modulation signal and each of said further addresses provided by said second up or down counter to said memory device designate a different modulation profile for said fast modulation signal.

14. A device, comprising:
a reference clock;
a phase detector for receiving an input from said reference clock;
an oscillator for receiving an input from said phase detector;
a phase locked loop modulator comprising:
a pre-divider;
a down counter for counting down from an input value;
said pre-divider receiving a digital output from said oscillator and providing an output to a clock input of said down counter producing an output which is connected as an additional input to said phase detector;
at least two dividers for receiving said output from said down counter;
corresponding at least two up or down counters receiving an output from a respective one of said at least two dividers;
a first adder;
a digital to analog converter providing an analog modulation signal as an output from said modulator;
a memory receiving an output from each of said at least two up or down counters with said memory providing at least two rate of modulation signals to said first adder, said first adder producing an output value supplied to one of said down counter as said input value and said digital to analog converter as an input;
and
an operative clock to provide spread spectrum clock control output from said oscillator to a clocked device, said spread spectrum clock control output having an operative profile that has a deviation of frequency of at least plus or minus 2.5 MHz and a modulation frequency of at least 150 kHz, wherein said spread spectrum clock control output being derived from said reference clock having a frequency of less than a central frequency defining the deviation of frequency.

15. The device of claim 14, further comprising:
a filter and a second adder connected between said output of said phase detector and said input of said oscillator with said output of said phase detector provided as an input to said filter and said output of said filter provided as an input to said second adder and said analog modulation signal is supplied as another input to said second adder, wherein said input value of down counter is a predetermined constant value and said second adder combines said analog modulation signal and said output of said filter to create said input to said oscillator.

16. The device of claim 14 wherein said at least two dividers and said corresponding at least two up or down counters comprise a first divider and a first up or down counter for providing addresses to said memory to provide a slow rate of modulation signal to said first adder and a second divider and a second up or down counter for providing further addresses to said memory to provide a fast rate of modulation signal to said first adder.

17. The device of claim 16 wherein said memory comprises a first memory device and a second memory device wherein said first divider and a first up or down counter provide said addresses to said first memory device and said second divider and a second up or down counter provide said further addresses to said second memory device.

18. The device of claim 16 wherein said memory comprises a four-ported memory device having a first input, a second input, a first output, and a second output wherein the first and second inputs respectively receive the outputs of said first and second up or down counters and said first and second outputs of said memory device are provided as an inputs to said first adder.

19. The electronic data processing device of claim 16 wherein each of said addresses provided by said first up or down counter to said memory device designate a different modulation profile for said slow modulation signal and each of said further addresses provided by said second up or down counter to said memory device designate a different modulation profile for said fast modulation signal.

* * * * *